United States Patent
Scuccato

(10) Patent No.: US 6,719,227 B2
(45) Date of Patent: Apr. 13, 2004

(54) GRINDING MILL AND METHODS FOR FABRICATING SAME

(75) Inventor: Serge Louis Scuccato, Peterborough, CA (US)

(73) Assignee: General Electric Canada Inc., Mississauga (CA)

(*) Notice: Subject to any disclaimer, the term of this patent is extended or adjusted under 35 U.S.C. 154(b) by 194 days.

(21) Appl. No.: 09/683,098

(22) Filed: Nov. 16, 2001

(65) Prior Publication Data

US 2003/0094524 A1 May 22, 2003

(51) Int. Cl.$^7$ .............................................. B02C 17/24
(52) U.S. Cl. ........................ 241/36; 241/176; 241/178; 241/285.1
(58) Field of Search ................................ 241/176, 178, 241/285.1, 36

(56) References Cited

U.S. PATENT DOCUMENTS

| | | | | |
|---|---|---|---|---|
| 3,577,928 A | | 5/1971 | Victorri | |
| 3,636,423 A | * | 1/1972 | Jenkins | 318/809 |
| 3,875,462 A | * | 4/1975 | Kiefer et al. | 241/36 |
| 3,903,439 A | * | 9/1975 | Kartman | 310/66 |
| 4,026,480 A | * | 5/1977 | Meyers | 241/30 |
| 4,360,753 A | * | 11/1982 | Shannon | 310/93 |
| 4,619,407 A | * | 10/1986 | Goldhammer | 241/30 |
| 5,244,275 A | * | 9/1993 | Bauer et al. | 366/314 |
| 5,660,339 A | | 8/1997 | Scott et al. | |
| 5,685,501 A | | 11/1997 | Wagner | |
| 5,860,364 A | | 1/1999 | McKoy | |
| 6,336,603 B1 | * | 1/2002 | Karkos et al. | 241/101.2 |
| 6,481,652 B2 | * | 11/2002 | Strutz et al. | 241/46.013 |
| 6,617,720 B1 | * | 9/2003 | Egan et al. | 310/67 R |

* cited by examiner

Primary Examiner—William Hong

(57) ABSTRACT

A method for fabricating a gearless grinding mill motor includes fabricating a plurality of linear stator portions and assembling a grinding mill stator from the linear stator portions.

7 Claims, 2 Drawing Sheets

GRINDING MILL AND METHODS FOR FABRICATING SAME

BACKGROUND OF INVENTION

This invention relates generally to mining operations and, more particularly, to grinding mills utilized in mining operations.

Currently, there are two main types of mills employed in mining operations, geared mills and gearless mills. Geared mills typically are power limited to approximately 9000 horsepower per pinion or 18,000 horsepower for a dual-pinion driven mill. Gearless mills, also called Ring Motor mills are employed when a mine operator desires a mill of greater than 18,000 horsepower, or in such cases, where the economics benefits justify the use of a Gearless mill with less than 18,000 horsepower. A typical gearless mill's ring motor works similar to a synchronous machine with a direct current field exciter. Accordingly, a gearless grinding mill motor includes a stator including a bore and one or more field windings. A rotor assembly extends at least partially through the stator bore and includes a rotor core and a rotor shaft/structure extending through the rotor core. The rotor core includes one or more armature windings. The stator of a gearless grinding mill is large and cannot fit in a Vacuum Pressure Impregnation (VPI) tank, which is typically utilized during the manufacture of stators for synchronous machines and other rotating and linear electrical machines. Available VPI tanks typically have a diameter of twelve feet or less and a depth of ten feet or less. Additionally, a grinding mill'S stator is sufficiently large that the stator can not be transported in one piece.

Accordingly, the stator is split into several segments that are individually transported from a motor manufacturer's plant to a customer's site. The number of segments depends on a size of the stator and shipping conditions or restrictions but typically the stator is segmented into three or four or more segments. After the segments arrive at the final assembly site, the segments are reassembled. Because segmenting the stator involves segmenting the core including the windings or coils, reassembling the stator involves reconnecting or closing the windings at the customer's site. However, closing the windings at a customer's site involves significant costs associated with employing skilled laborers (winders) to close the windings and a higher risk of contamination because the customer's site (a mine) is typically dirty and constitutes a contaminated environment. Additionally, the closed winding can not be factory tested as a winding assembled in a factory can be.

Accordingly, a need exists for providing a large gearless grinding mill including stator windings that are closed at a factory and not segmented for transfer to a customer's site.

SUMMARY OF INVENTION

In one aspect, a method for fabricating a gearless grinding mill motor is provided. The method includes fabricating a plurality of linear stator portions and assembling a grinding mill stator from the linear stator portions.

In another aspect, the method includes fabricating a plurality of substantially identical linear stator portions each including a substantially identical linear drive wherein one drive is programmed to be a master drive. Each stator portion includes a plurality of dimensions each less than three meters, and each linear stator portion further includes one three phase winding electrically connected to the linear drive. Each three phase winding is substantially galvanically isolated from all other three phase windings. The method further includes assembling the linear stator portions to form a stator including a bore therethrough.

In another aspect, a grinding mill is provided. The grinding mill includes a stator including a bore therethrough and a plurality of linear stator portions. The grinding mill further includes a shell rotatably mounted at least partially within the bore and at least one winding mounted on the shell and separated from the stator by an air gap.

DETAILED DESCRIPTION

Figure 1:
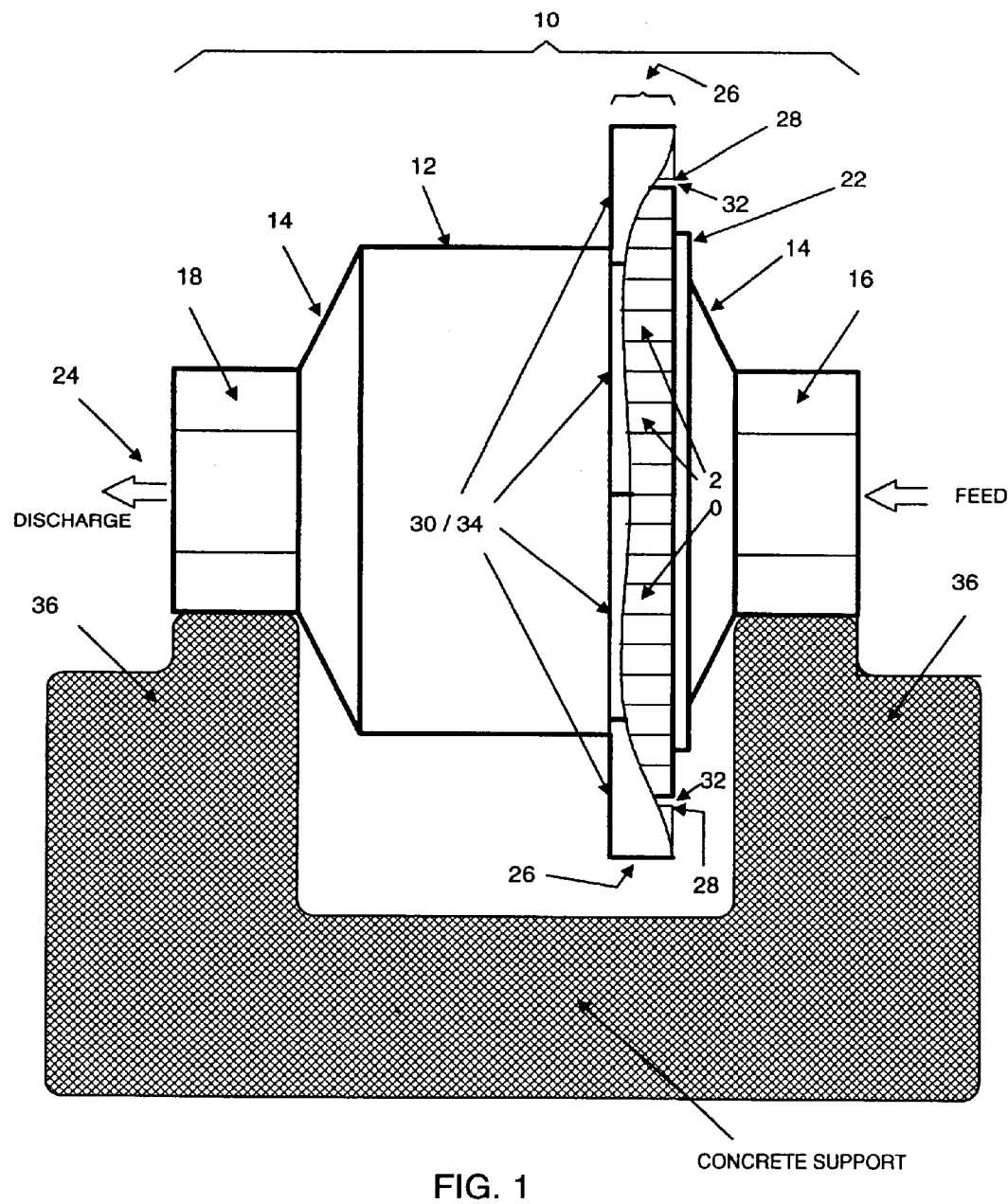
FIG. 1 is a partially cut away perspective view of one embodiment of a linear grinding mill motor.

FIG. 1 is a partially cut away perspective view of one embodiment of a linear grinding mill 10 including a shell 12 including a mill head 14 rotatably supported by a feed end trunion bearing 16 and a discharge end trunion bearing 18. A plurality of rotor field windings or rotor poles 20 are mounted on shell 12 at a periphery 22 of mill head flange 14 and extend away from first trunion bearing 16 toward a back end 24 of mill 10. A stator 26 including a bore 28 is positioned such that shell 12 extends at least partially through bore 28. Stator 26 includes a plurality of linear stator portions 30 circumferentially encircling rotor poles 20. Linear stator portions 30 are separated from rotor poles 20 by an air gap 32. Each linear stator portion 30 includes at least one three phase winding (not shown in FIG. 1) and at least one linear drive 34 which powers and controls each linear stator portion 30. In an exemplary embodiment, each linear stator portion 30 includes a core section and a single three phase winding and is powered and controlled by a single linear drive 34, wherein all linear drives 34 are substantially identical in power and control components and all linear drives 34 are in electrical communication with each other and one particular linear drive 34 is programmed to be a master drive. The linear motor driving grinding mill 10 further includes a solidified load circuit (not shown) electrically connected to the master drive. Trunion bearings 16 and 18 are each mounted to a respective concrete support 36.

Figure 2:
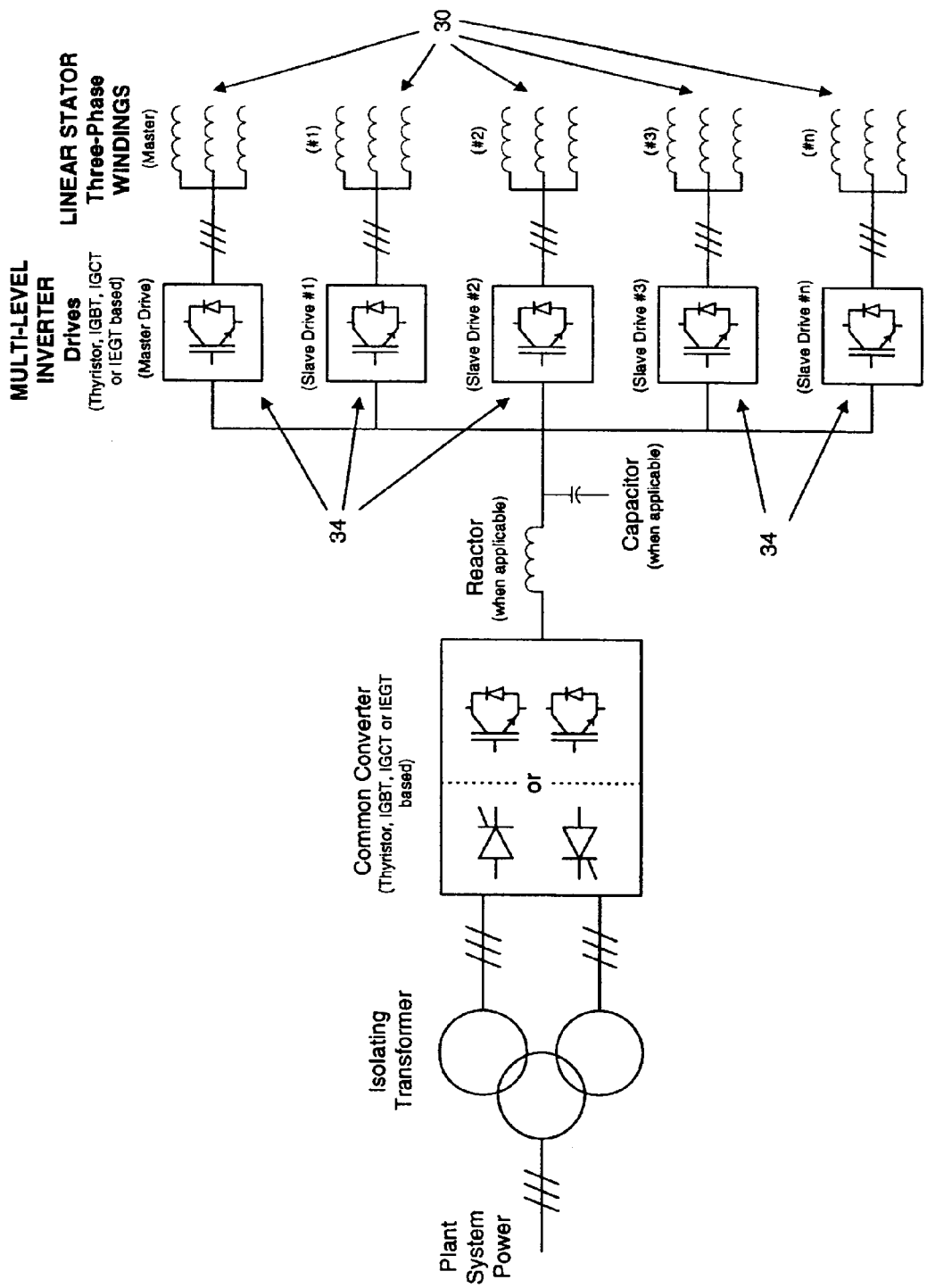
FIG. 2 is a schematic view of the linear drives shown in FIG. 1.

In an alternative embodiment, all linear drives 34, as shown in FIG. 2, are substantially identical in power and control components except for the master drive which is different from all other linear drives 34. The master drive generates an overall torque reference control signal which controls all the other linear drives 34 (slave drives) to maintain whatever speed the master drive is programmed to operate the mill at. Additionally, the master drive can quickly stop all drives upon detection of a single drive failure reducing the risks associated with an air gap collapse. Furthermore, because all linear drives 34 are substantially identical, the customer need only stock one replacement unit and inventory costs are, hence, reduced. In addition, since all linear stator portions 30 are substantially identical, the customer also need only stock one replacement linear stator portion for repairs if a core section or a winding needs to be repaired, hence, lowering inventory costs further.

In an exemplary embodiment, each linear stator portion 30 includes one three phase winding that is separate from the windings in other linear stator portions 30 and each set of windings is galvanically isolated from other three phase windings. Each winding is wound substantially identically, containing an identical even number of poles, and is controlled by one respective linear drive 34. In one embodiment, each linear drive 34 utilizes cycloconverters (CCV) drive technology. In an alternative embodiment, each linear drive 34 utilizes pulse width modulated (PWM) drive technology.

In a linear grinding mill utilizing CCV technology, linear stator portions 30 are arranged and controlled to provide for either a three phase twelve pulse phase control or a three phase twenty-four pulse phase control to lower harmonic impact on each linear drive 34. Alternatively, in a linear grinding mill utilizing a PWM linear drive 34, harmonic impact is controlled through the use of an isolated gated dipolar transistor (IGBT) PWM drive, an integrated gate commutated thyristor (IGCT) PWM drive, and/or an injection enhanced gate transistor (IEGT) PWM drive.

Each linear stator portion 30 is sized to fit within conventional Vacuum Pressure Impregnation (VPI) tanks. In an exemplary embodiment, each linear stator portion has dimensions less than or equal to three meters. Accordingly, each linear stator portion 30 is fully manufactured in a manufacturing plant and is factory tested. The portions are then assembled at a customer's site. In one embodiment, the portions are assembled at the customer's site to form an integral stator. Utilizing a plurality of linear stator portions 30 with individual linear drives 34 allows for reduced costs due to smaller inventory costs and reduced assembly time as explained above, and by testing all stator windings at the factory. In addition, since occurrences of open windings at the customer's site is reduced, stator coil failures are reduced which increases motor and system reliability. Additionally, a motor manufacturer can easily provide grinding mills of different sizes by altering the number of linear stator portions the manufacturer incorporates into a particular mill. Therefore, inventory costs for the manufacturer are reduced because grinding mills of different sizes can share the same replacement parts.

In an exemplary embodiment, each linear drive 34, including the particular drive programmed to be a master drive is substantially identical and only one drive need be inventoried for repair reasons, thus reducing inventory costs. Installing a linear grinding mill is less expensive than traditional gearless motors because the time required for installation and assembly is shorter and fewer skilled people are needed for the assembly and installation.

During operation of linear grinding mill 10, the master drive controls all other linear drives 34 causing shell 12 to rotate. Large pieces of material (charge) to be reduced in sized (comminution) are fed into shell 12 through an opening (not shown) proximate to feed end trunion bearing 16. Since shell 12 is rotating, the charge tumbles and breaks into small pieces. When the charge is as crumbled as desired the charge is removed from shell 12 through an opening (not shown) proximate to discharge end trunion bearing 18. If a drive 34 should fail, the master drive receives feedback of the drive failure and the master drive quickly stops motor 10 by directing all linear drives 34 to stop rotation of shell 12. The master drive also receives signals from the solidified load protection circuit and upon receiving an indication of a solidified load within shell 12, the master drive stops rotation of shell 12.

While the invention has been described in terms of various specific embodiments, those skilled in the art will recognize that the invention can be practiced with modification within the spirit and scope of the claims.

What is claimed is:

1. A gearless grinding mill comprising:
   a stator comprising a bore therethrough, said stator further comprising a plurality of linear stator portions;
   a shell rotatably mounted at least partially within said bore; and
   at least one winding mounted on said shell separated from said stator by an air gap.

2. A grinding mill in accordance with claim 1 wherein said plurality of linear stator portions comprises a plurality of substantially identical linear stator portions.

3. A grinding mill in accordance with claim 1 wherein each linear stator portion comprises a substantially identical linear drive.

4. A grinding mill in accordance with claim 1 wherein each linear drive comprises at least one of a CCV linear drive, an IGBT PWM drive, an IGCT PWM drive, and an IEGT PWM drive.

5. A grinding mill in accordance with claim 1 wherein each linear stator portion comprises a three phase winding substantially galvanically isolated from adjacent said three phase windings.

6. A grinding mill comprising
   a stator comprising a bore therethrough, said stator further comprising a plurality of substantially identical linear stator portions, each stator portion comprising one three phase winding and a linear drive, each said three phase winding comprising an even number of poles and substantially galvanically isolated from other said three phase windings, one said linear drive comprising a master drive and controlling all other said drives;
   a shell rotatably mounted at least partially within said bore; and
   at least one winding mounted on said shell separated from said stator by an air gap.

7. A grinding mill according to claim 6 wherein said master drive controlling all other said drives utilizing an overall torque reference control signal.

* * * * *

UNITED STATES PATENT AND TRADEMARK OFFICE
CERTIFICATE OF CORRECTION

PATENT NO. : 6,719,227 B2
DATED : April 13, 2004
INVENTOR(S) : Serge Louis Scuccato It is certified that error appears in the above-identified patent and that said Letters Patent is hereby corrected as shown below:

Column 4,
Line 17, after "portions" insert -- each stator portion comprises a linear drive and at least one linear drive is programmed to be a master drive; wherein each linear drive comprises at least one of a CCV linear drive and a PWM linear drive, said master drive controlling all other said drives; --.

Signed and Sealed this

Twenty-fourth Day of January, 2006

JON W. DUDAS
*Director of the United States Patent and Trademark Office*